July 27, 1965
B. B. BAUER
3,197,712
SIGNAL COMPRESSOR AND EXPANDER APPARATUS
Filed March 22, 1961
4 Sheets-Sheet 1
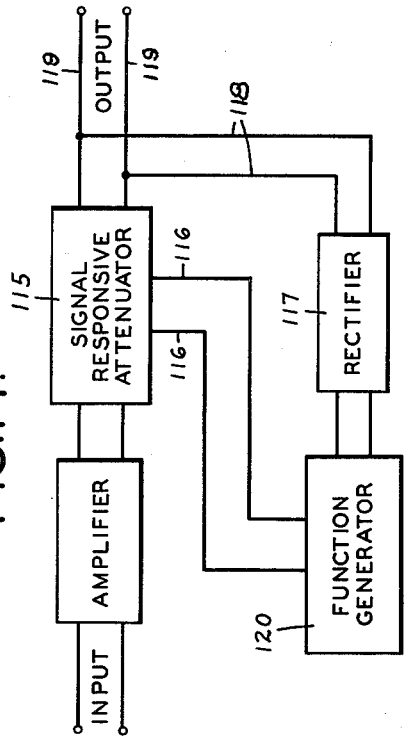
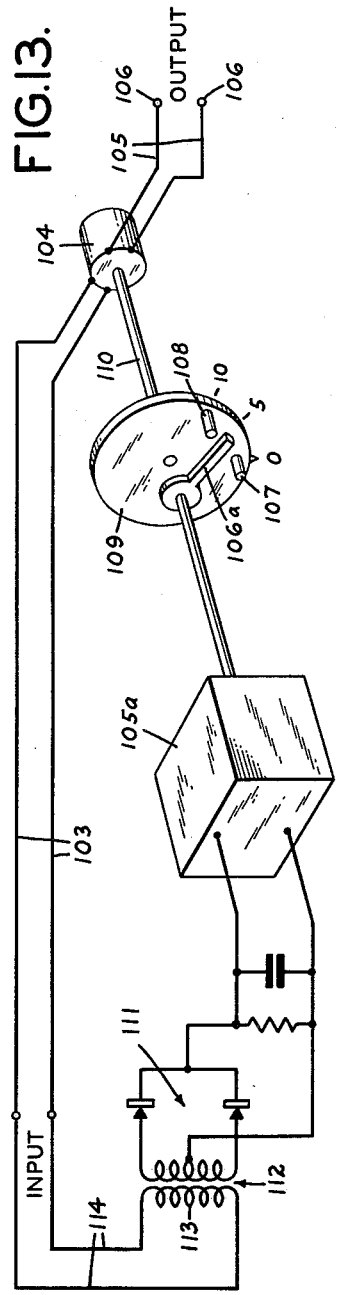
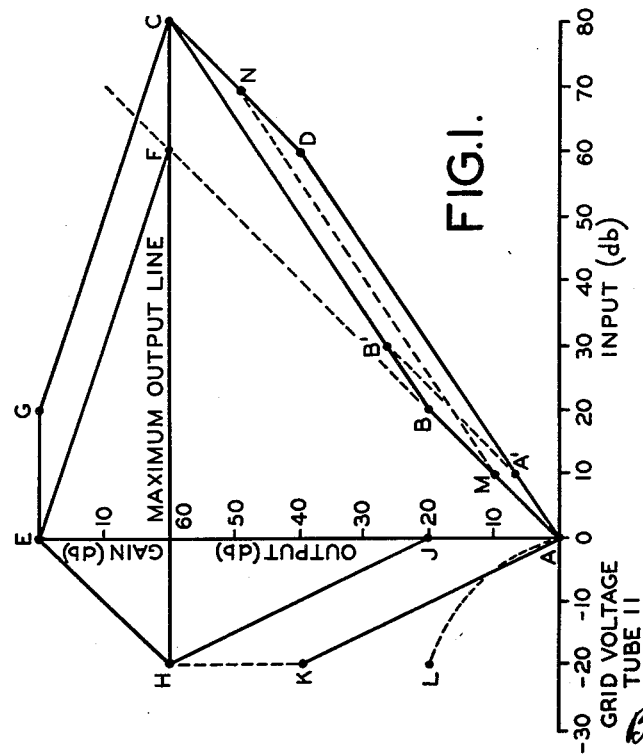
INVENTOR
BENJAMIN B. BAUER
BY
HIS ATTORNEYS

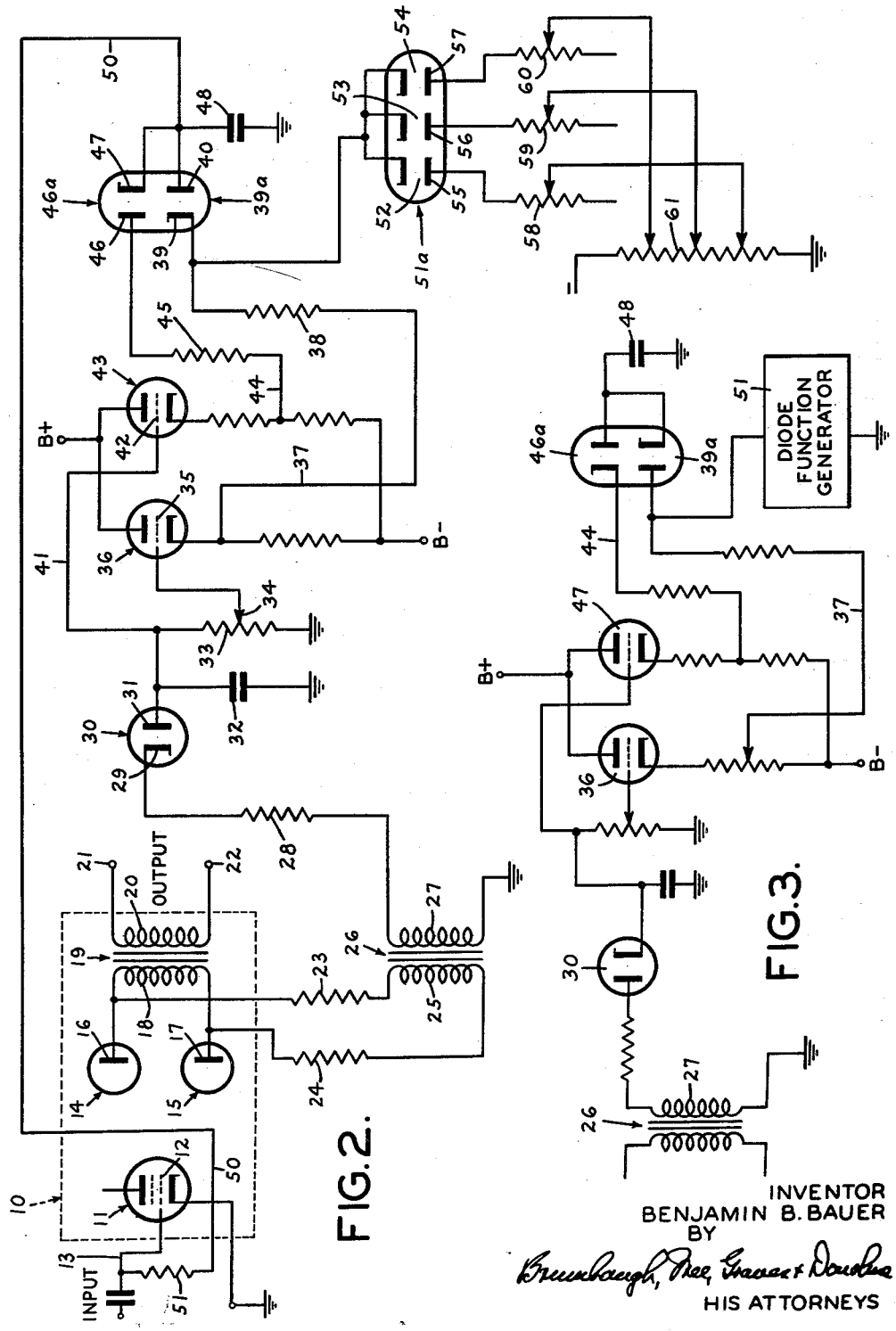

INVENTOR
BENJAMIN B. BAUER

July 27, 1965  B. B. BAUER  3,197,712
SIGNAL COMPRESSOR AND EXPANDER APPARATUS
Filed March 22, 1961  4 Sheets-Sheet 4

INVENTOR
BENJAMIN B. BAUER
BY
HIS ATTORNEYS

3,197,712
SIGNAL COMPRESSOR AND EXPANDER APPARATUS
Benjamin B. Bauer, Stamford, Conn., assignor to Columbia Broadcasting System, Inc., New York, N.Y., a corporation of New York
Filed Mar. 22, 1961, Ser. No. 97,636
6 Claims. (Cl. 330—132)

The present invention relates to signal transmission apparatus embodying means for automatically modifying a characteristic such as the gain or frequency response as a function of signal level. More specifically, it has to do with novel and highly effective sound recording-reproducing systems in which the automatic modification of the characteristic takes place in such a way that the reproduced sound is artistically satisfying to a degree not attainable heretofore.

It is common knowledge that the dynamic range of much program material is considerably greater than can be accommodated by the sound recording and reproducing systems currently being used. Thus, orchestral music in a concert hall may have a dynamic range as great as 80 db and an average phonograph system perhaps no more than 50 db. Accordingly, it has sometimes been the practice, prior to the recording process, to compress the dynamic range of a signal representing the program material to be recorded. While the conventional volume limiting amplifier has been used to prevent the volume level from rising above a safe maximum, it is not suited for dynamic range compression, particularly where it is required that the sound reproduction be artistically acceptable to discriminating listeners.

A variety of different kinds of compressors have also been used to attenuate program representing signals or to reduce the gain of an amplifier as a function of the signal amplitude. While the best of these have been quite effective for slowly occurring dynamic changes, they are not satisfactory for rapidly occurring changes in dynamics. Specifically, for signals representing music, such compressors tend either to reduce the impact of accented notes or to alter the decay characteristics of percussive tones. As a result, over an interval of a few seconds, a listener may notice the diminution of dynamic range between successive notes of a musical phrase and a corresponding amplitude modulation of background noise or low level accompaniment.

Noise suppressors have also been devised which automatically change the frequency bandwidth of a signal transmission channel means with varying signal level. However, they have not been satisfactory because the change in bandwidth occurs continuously causing annoying "swishing" noises.

It is an object of the invention, accordingly, to provide new and improved signal transmission systems of this general character that are free from the above-noted deficiencies of the prior art.

Another object of the invention is to provide new and improved signal transmission channel means embodying automatic control means which is capable of modifying a characteristic of a transmitted signal in such fashion that a reproduction of the intelligence embodied in the signal contains a minimum of noticeable undesired effects.

A further object of the invention is to provide new and improved sound recording apparatus embodying highly effective signal compression means whereby the dynamic range of a signal can be compressed yet the intelligence carried by the signal can be reproduced in a most artistically satisfying manner.

Still another object of the invention is to provide new and improved sound reproducing apparatus embodying signal expansion means which is capable of effecting total or partial complementary expansion of a compressed signal in a simple and highly effective manner, or expansion of noncompressed signal in an artistically satisfactory manner.

A further object of the invention is to provide new and improved signal transmission channel means embodying means for automatically modifying the frequency response characteristics of the channel means as a function of the signal volume level.

Broadly speaking, the invention contemplates the provision of signal transmission channel means embodying means responsive to signal volume level for automatically modifying a characteristic of the transmission channel means (e.g., gain or frequency response). Modification of the characteristic does not take place continuously as the signal volume level varies; it is effected in such fashion as to permit a given range of signal level variation during which the characteristic remains constant before modification of the characteristic occurs. One way of accomplishing this is to provide for continuous modification of the characteristic with increasing signal levels but no modification with decreasing signal levels until the signal level has dropped a predetermined amount, thus providing a "platform" at which the characteristic is not changed.

In order to effect signal compression, for example, the signal transmission channel may have constant gain for an initial signal input range, of say 20 db. If the signal level rises above 20 db to a new value, the gain automatically is reduced to a new value and remains constant at that value so long as the signal level does not drop more than 20 db. As the signal level continues to rise, further reduction of the gain occurs, the compression preferably being linear, and the gain at each level remains constant so long as the signal level does not drop more than 20 db. As soon as the signal level decreases below the 20 db range, the gain of the transmission channel level means increases to a higher value which is maintained so long as the signal level does not decrease further or rise more than 20 db. If the signal level drops suddenly to zero, the gain quickly increases continuously to a maximum value, in accordance with the preferred linear compression characteristic.

For signal expansion, operation is essentially the same except that for rising and falling values of signal level, the gain is increased and decreased, respectively, in a manner which may be, but need not be complementary to the mode of compression to which the signal was originally subjected.

According to another embodiment of the invention, the signal transmission channel may have a given frequency response characteristic for signal levels in an initial range. As this range is exceeded by increasing signal levels, the frequency response characteristic is successively modified in stages. However, each time the frequency response characteristic is changed, it remains constant at the new value until the signal level is either increased to a new value or is reduced by more than a specific amount, thus establishing a constant characteristic "platform." As the signal level continues to be reduced, the frequency response characteristic of the transmission channel means is successively modified in a complementary manner in stages. In this fashion, the noise level in a sound reproducing system can be reduced substantially at low signal levels where it is usually most noticeable to the listener, without at the same time being subjected to a "swishing" modulation which is prevalent in conventional noise suppression circuits.

For a better understanding of the invention, reference is made to the following detailed description of several representative embodiments, taken in conjunction with the accompanying drawings in which:

FIG. 1 is a graph illustrating typical operating conditions in a compressor device constructed according to the invention;

FIG. 2 is a schematic diagram of a compressor device having operating characteristics as indicated in FIG. 1;

FIG. 3 illustrates schematically how the control signal generator of FIG. 2 can be modified to produce volume expansion;

FIGS. 13 and 14 are schematic diagrams of attenuator type compressor devices according to the invention.

Figure 4:
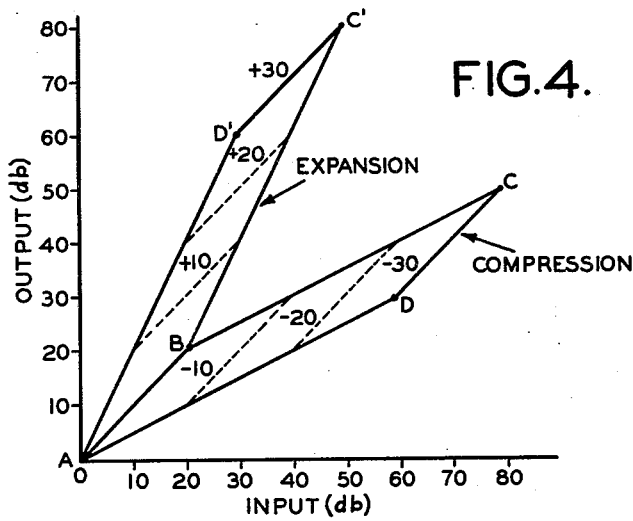
FIG. 4 is a graph illustrating operating conditions in a complementary expander device constructed according to the invention.

For purposes of illustration, the invention will first be described as embodied in a compressor device for compressing the dynamic range of a signal to a smaller range.

The operating limits desired for a compressor device according to the invention are represented graphically by the boundary ABCDA in FIG. 1. For an initial input signal dynamic range, say 0–20 db, it is desired that the gain of the compressor device remain constant as indicated by the line AB in FIG. 1. As the input signal level increases beyond the upper limit of the initial range (20 db), the gain is required to diminish automatically with increasing signal so that linear compression of the signal is effected up to the maximum input (80 db in FIG. 1), as represented by the line BC. However, for decreasing input signal levels after attainment of any peak level in the range BC (FIG. 1), the gain remains constant, for a decrease in signal level of, say, 20 db, at the value obtaining at the instant the signal level last changed from increasing to decreasing. As the input signal level continues to drop below the constant gain "platform" or range, the gain now increases with decreasing signal level, this operating condition being represented by the line AD in FIG. 1. If the input signal level drops to zero, the output signal drops instantaneously with the input along the line AD, the gain being rapidly raised to 20 db.

By way of example, assume that the input signal level increases steadily from zero to a maximum value of 30 db and then decreases steadily to zero. During the rise in signal level from 0 to 20 db, the gain of the compressor will remain constant as indicated by the line AB in FIG. 1. For the continued rise in signal level from 20 db to 30 db, the compressor gain will be continuously reduced in such fashion as to produce linear compression of the signal in this range, as represented by the line BB' in FIG. 1. As the signal level then decreases from 30 db to 10 db, the compressor gain will remain constant at the value corresponding to the point B' in FIG. 1. For decreasing signal level from 10 db to zero, the compressor gain now increases quickly at a uniform rate as indicated by the line AA', which corresponds to linear compression of the same character as that represented by the line BC. This mode of operation may be viewed as linear mode compression along the line MN (FIG. 1) with provision for ±10 db uncompressed operation about this line.

It is desirable in recording applications to adjust the attack time to 1 millisecond or less, and to adjust the decay time to about 0.3 sec., although wide departure from these values is possible.

By virtue of the fact that for a substantial input signal dynamic range (e.g., 20 db), the compressor device operates on a constant gain "platform," compression can be effected with little or no loss in artistic expression where the signal represents a musical selection.

In FIG. 2 is shown a practical form of compressor device which is capable of meeting the operating conditions depicted in FIG. 1. It comprises a conventional adjustable gain amplifier 10 having an input stage including an electron tube 11 with a control grid 12 which is adapted to receive an input signal over a conductor 13. The tube 11 is preferably a so-called variable mu tube, such as the type 6SK7, for example. The amplifier 10 may also have one or more intermediate stages (not shown) and an output stage including a pair of electron tubes 14 and 15 having anodes 16 and 17, respectively, connected to the primary winding 18 of a transformer 19. The secondary winding 20 of the transformer 19 is adapted to supply the amplifier output to the terminals 21 and 22.

In accordance with the invention, linear compression with provision for a constant gain "platform" over a suitable signal level range is adapted to be effected by controlling the grid bias applied to the grid cathode circuit of the tube 11 in response to a biasing signal derived from the output of the amplifier 10. To this end, the amplifier output is supplied from the anodes 16 and 17 of the tubes 14 and 15, respectively, through the resistors 23 and 24 to the primary winding 25 of a transformer 26. The transformer 26 has a secondary winding 27, one end of which is grounded, and the other end of which is connected through a resistor 28 to the cathode 29 of a unilaterally conducting device 30, such as a type 6AL5 diode having an anode 31. The rectified output of the diode 30 is supplied to a capacitance 32 across which is shunted a potentiometer 33 having a slider 34. Preferably, the decay time constant of the RC circuit comprising the capacitor 32 and the resistor 33 should have a low value (e.g., .033 sec. or less).

The slider 34 is connected to the control grid 35 of an electron tube 36 which is connected as a cathode follower supplying an output over a conductor 37 through a resistor 38 to the cathode 39 of a unilaterally conducting device such as a diode 39a having an anode 40. In similar fashion, the upper end of the potentiometer 33 is connected by a conductor 41 to the control grid 42 of an electron tube 43 which is connected as a cathode follower and supplies an output over a conductor 44 through a resistor 45 to the anode 46 of a unilaterally conducting device such as a diode 46a having a cathode 47. The D.C. potential difference between the conductors 44 and 37 determines the extent of the signal level range over which the constant gain "platform" obtains. The anode 40 and the cathode 47 are connected to a capacitor 48. The recovery time of the capacitor 48 is essentially infinite until the diode 46a conducts. The control signal output appearing across the capacitor 48 is fed through a conductor 50 to the grid return resistor 51.

For linear mode compression as represented by the line BC in FIG. 1, with increasing signal level, the gain of the amplifier 10 should vary in the manner indicated by the line GC. Assuming that the tube 11 is a type 6SK7, the gain versus grid voltage characteristic required to achieve this form of gain variation is represented by the line HE in FIG. 1. This relation is linear and the slope of the curve is approximately 1 db per volt. The line HJ represents the control voltage as a function of compressor output which is required to yield the desired linear mode of compression for increasing signals.

Similarly, the line EF in FIG. 1 represents the manner in which the gain of the amplifier 10 is required to vary with decreasing signals to effect linear mode compression according to the line AD in FIG. 1; and the line KA indicates how the control voltage supplied to the grid cathode of the tube 11 should vary with compressor output to produce the desired gain variation.

It will be noted that for both increasing and decreasing signals the control voltage is required to vary linearly with the output signal in db, in order to effect linear mode compression in the manner indicated. However, the rectified output appearing across the resistor 34 varies in a nonlinear manner with the compressor output signal, as shown by the dotted line curve AL in FIG. 1. It is desirable, therefore, to provide means for converting the relation between the output signal and the rectified control voltage to a linear form. This may be accomplished in any suitable manner as by connecting a diode clamp function generator 51a between ground and a point between the resistor 38 and the cathode 39 (FIG. 2).

The function generator 51a may comprise a plurality of diodes 52, 53 and 54 having anodes 55, 56 and 57 connected through adjustable resistors 58, 59 and 60 to different values of bias voltage provided by a voltage divider 61 connected to a suitable source of negative voltage (not shown). It will be understood that by adjusting the values of the resistors 58, 59 and 60 and the biases applied to the diodes 52, 53 and 54, the nonlinear relation depicted by the curve AL in FIG. 1 may be converted to a linear curve such as the line KA, for example.

In operation, assume that the potential difference between the conductors 37 and 44 is set so that the constant gain "platform" prevails over a 20 db range, and that the signal input rises from zero to thirty db and then drops to zero. As the signal rises from zero, the rectified output of the amplifier 10 charges the condenser 32 and its voltage begins to rise. The portion of this voltage which appears at the slider 34 is fed through the cathode follower tube 36, the conductor 37, the resistor 38 and the diode 39a to the condenser 48 which begins to charge up. The diode 46a does not conduct at this time. The voltage across the condenser 48 is fed over the conductor 50 to the control grid 12 of the tube 11 and controls the gain of the latter. As the input signal continues to increase to the point B′ in FIG. 1, the control voltage fed back over the conductor 50 also increases and causes the gain of the tube 11 to be reduced in such fashion as to produce linear mode compression of the signal as represented by the line CB in FIG. 1.

When, after reaching the peak value B′ (FIG. 1), the signal begins to diminish, the charge across the capacitor 48 does not change but remains essentially constant until the output signal level has dropped to one-tenth of its original value (i.e., 20 db). When this occurs, the voltage across the diode 46a is equal and opposite to the voltage across the condenser 48 so that the diode 46 is on the verge of conducting. As the input voltage drops still further, the capacitor 48 is discharged through diode 46a and the resistor 45. This reduces the control voltage applied to the grid cathode circuit of the tube 11 so that the gain increases in accordance with the characteristic represented by the line AD in FIG. 1. It will be apparent, therefore, that the system shown in FIG. 2 fulfills operating conditions depicted in the graph of FIG. 1.

For operation as an expander, the diodes 30, 46a and 39a in FIG. 2 should be reversed in polarity as shown in FIG. 3. Also, the bias and load values in the diode function generator 51a should be appropriately modified to provide the proper relation between the amplifier output voltage and the grid voltage required to be supplied to the grid cathode circuit of the tube 11 (FIG. 2). The operating conditions in an expander of this type are indicated by the graph shown in FIG. 4. By appropriate design, it will be understood that an expander may be designed to expand a signal in complementary fashion to the mode of compression originally applied thereto.

Figure 5:
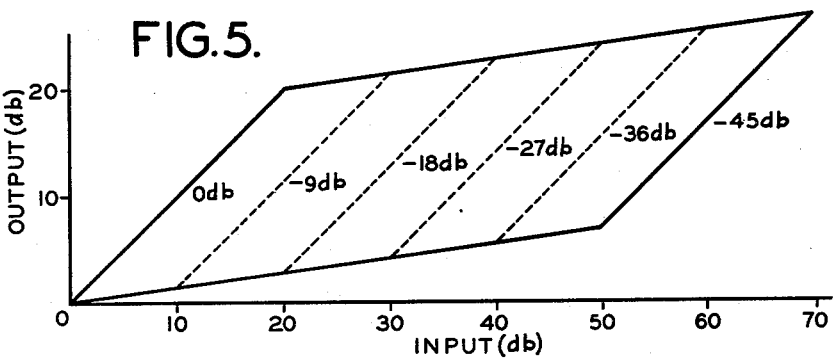
FIGS. 5 and 6 are graphs showing typical compression characteristics for compressor devices embodying the invention.
Figure 6:
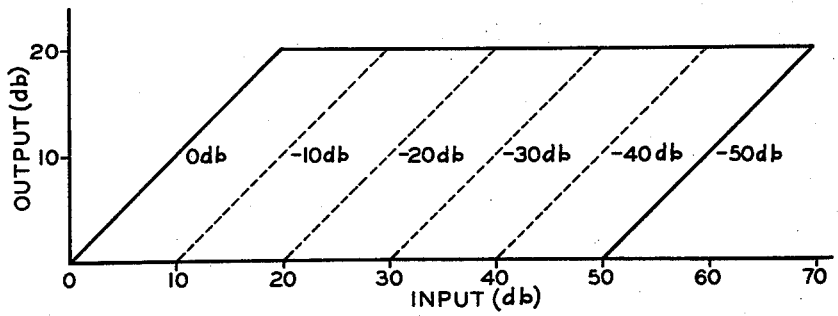

While the system shown in FIG. 2 is designed for linear mode compression with a compression exponent of ¾ and for a "platform" of 20 db, it will be understood that other compression exponents and "platform" values can be used, depending upon the characteristics desired. For example, for speech transmission over a limited range, a compression characteristic of the type shown in FIG. 5 might be used. Again, for hearing aid purposes, where the range of the ear between the threshold of hearing and the point of damage may be small, a characteristic of the type shown in FIG. 6 may be desired. In a signal transmission channel having such a characteristic, the gain is constant for an initial input signal range and all increasing signal values above this range are subjected to limiting action, i.e., the output is prevented from rising above a predetermined value, regardless of the input signal amplitude. However, for decreasing signal values, the gain remains constant for a given range or "platform," the extent of which can be adjusted to suit the need.

Figure 7:
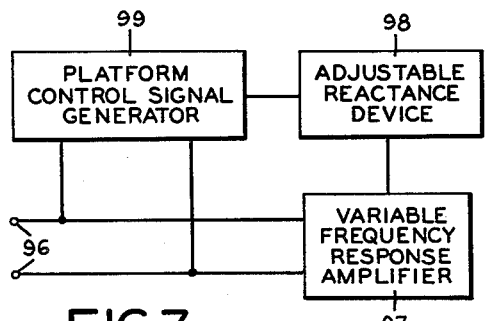
FIG. 7 illustrates in schematic form apparatus according to the invention for automatically controlling the frequency response of a signal transmission channel.

FIG. 7 shows noise suppressor apparatus in which the frequency response of a signal transmission channel is controlled as a function of the signal level according to the invention. Typically, the system may be designed to reduce the frequency response of the transmission channel at low signal levels so as to get rid of undesired noise.

In FIG. 7, an input signal is supplied to the input terminals 96 of an amplifier 97 including a voltage responsive adjustable reactance device 98 which controls the amplifier frequency response. The adjustable reactance device 98 may be a conventional reactance tube, a saturable reactor, or a voltage responsive condenser, for example. The adjustable reactance device 98 is adapted to be controlled by a control signal provided by a platform control voltage generator 99 which also receives the signal input at the terminals 96.

Figure 8:
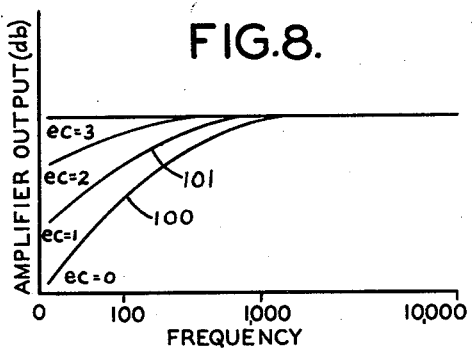
FIGS. 8 and 9 are graphs illustrating typical operating conditions in the apparatus shown in FIG. 7.
Figure 9:
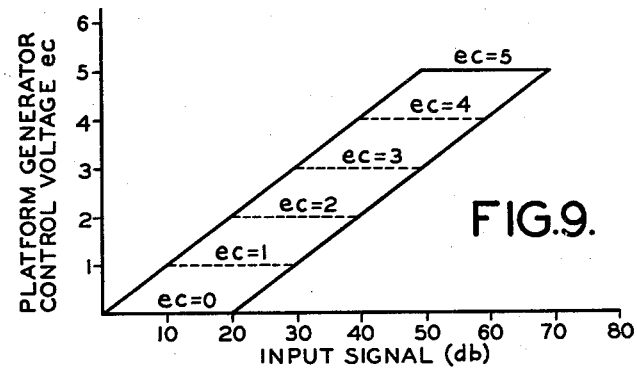

FIG. 8 shows typical frequency response curves for the amplifier 97 for different values of control voltage $e_c$ and FIG. 9 shows one way in which the control voltage from the generator 99 may be made to vary as a function of the input signal level. From FIGS. 8 and 9, it will be apparent that at low signal levels, the low frequency response of the amplifier 97 will be restricted, as indicated by the curve 100 in FIG. 8. As the signal level increases, the low frequency response of the amplifier 97 is expanded to, say, the characteristic indicated by the curve 101 in FIG. 8 and this characteristic prevails so long as the signal level does not go below the "platform" range, say 20 db. If the level drops suddenly to zero, the control voltage from the generator 99 will fall rapidly to zero, quickly restricting the low frequency response of the amplifier 97 and reducing the noise level.

Figure 10:
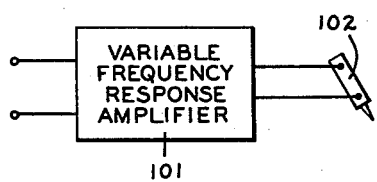
FIG. 10 shows schematically a phonograph reproducing system embodying the invention.

Modification of frequency response as a function of signal level may also be employed to advantage in recording. One possible application of interest is the raising of the recording modulation level at the low frequency end with dropping signal level to compensate for the impaired perception of low frequencies by the human ear at low levels of reproduction. This may be accomplished as shown in FIG. 10 by feeding the signal input to a recording amplifier 101, the frequency response of which varies as a function of the input signal level. The amplifier output is fed to a conventional recording device 102 which may be a recording cutter for example.

Figure 11:
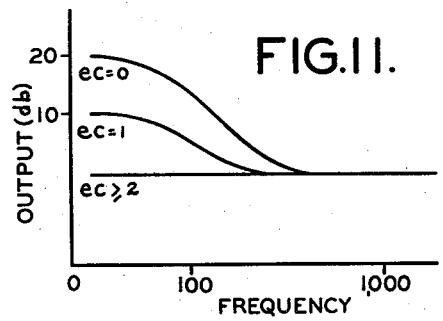
FIGS. 11 and 12 are graphs showing representative operating conditions for the phonograph reproducing system of FIG. 10.
Figure 12:
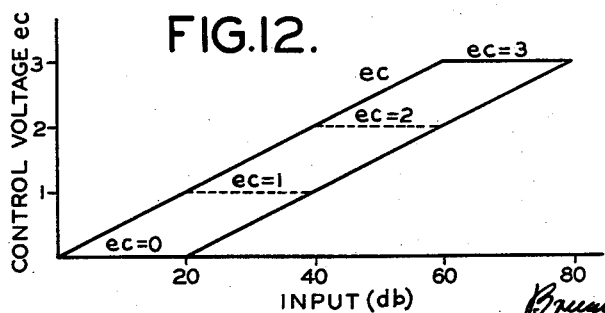

The amplifier 101 may comprise an adjustable reactance device and a platform control signal generator essentially as in FIG. 7. However, these components are so designed as to provide frequency response characteristics of the type shown in FIG. 11 for different values of control voltage, and to provide a relation of the kind indicated in FIG. 12 between the control voltage and the input signal level. The curves shown are only approximate and, in practice, the specific contours should be developed in the light of the capabilities of the recording device 102 and the well known Fletcher Munson equal loudness contours.

Records made with the recording apparatus shown in FIG. 10 are of particular utility for reproduction with "platform" noise suppressor apparatus of the type shown in FIG. 7. It will be understood that the high frequency end of the signal transmission band may be similarly treated.

It is also possible to achieve "platform" compression (or expansion) according to the invention by interposing in a transmission channel for the signal an adjustable attenuator which is controlled automatically in response to signal level. Thus, in FIG. 13, an input signal is supplied over the conductors 103 to an adjustable attenuator 104 of sufficient range to effect compression of the signal level to a desired degree. The attenuator output is supplied over the conductors 105 to output terminals 106. Adjustment of the attenuator 104 is effected by a motor 105a having an arm 106a on the shaft thereof which is adapted to engage either of two pins 107 and 108 mounted on a plate 109 carried by the attenuator control shaft 110. The motor 105a is normally urged by suitable means (not shown) in the direction to restore the attenuator 104 to its initial zero or other reference position.

The motor 105a is adapted to be energized by a full wave rectifier 111 which receives the input signal from a transformer 112 having a primary winding 113 connected by the conductors 114 to the input conductors 103.

The pins 107 and 108 are angularly spaced apart on the plate 109 so as to permit free movement of the arm 106a therebetween through an arc corresponding to a change of signal level equal in amount to the "platform," say 20 db. It will be understood, therefore, that as the input signal increases from zero or other reference level, there will be no change in the adjustment of the attenuator 104 until the change in signal level exceeds 20 db, the "platform." At that time, the motor arm 106a will be in engagement with the pin 107 and as the signal level continues to increase, will move the latter and change the adjustment of the attenuator 104 in the linear compression mode. If the signal level now decreases, there will be no further change in the adjustment of the attenuator 104 until the reduction in signal level exceeds the "platform" of 20 db. The motor arm 106a will then engage the pin 108 and will move it to reduce the attenuation produced by the attenuator 104. It is clear, therefore, that the requirements imposed by the curves in FIG. 1 are met.

For expansion, it is only necessary that the connections to the rectifier 111 be reversed so that for increasing signal levels beyond the 20 db platform, the attenuator adjustment will reduce the amount of attenuation, preferably in a linear mode.

Another form of attenuator compressor is shown in FIG. 14, in which the attenuator 115 is of any suitable type that is responsive to a control signal. The control voltage may be provided over the conductors 116 by a "platform" rectifier 117 of the type shown in FIG. 1 above, which is connected by the conductors 118 to receive the attenuator output at the conductors 119. If modification of the control signal from the rectifier 117 is necessary, a function generator 120 of suitable characteristic may be interposed between the rectifier and the attenuator 115.

For compression, the varying bias supplied over the conductors 116 should be such as to produce increasing attenuation with increasing signal level; for expansion, the bias should cause the attenuation to vary inversely with signal level.

The invention thus provides highly effective means for automatically modifying a characteristic such as the gain or frequency response of a signal transmission channel in accordance with signal level. By effecting the modification in a linear mode with provision for a signal level range "platform" of suitable extent at each signal level, in which the characteristic does not change, the desired modification can be accomplished without perceptible deterioration of the intelligence carried by the signal. Embodied in sound compression and expansion apparatus, it enables reproduction to be achieved in a manner that is most satisfying artistically.

It will be understood that the control signal in the several embodiments described above can be derived from the input signal instead of the output signal, although the latter is preferred. Also, the several aspects of the invention may be applied with equal effectiveness to each of the channels of a stereophonic system. In such case, however, the control signal for each channel should preferably be a function of the combined signals in the channels.

The invention is not limited to sound reproducing systems but is susceptible of utility in any system where modification of a characteristic of a signal transmission channel as a function of signal level is desirable or necessary. For example, it may be embodied in picture transmission systems to compress the wide range of signal intensities picked up by a scanning system to a smaller range than can be accommodated by the transmission system. Other uses will be apparent to those skilled in the art.

The several embodiments of the invention described above and illustrated in the drawings are obviously susceptible of modification in form and detail. The invention, therefore, is not to be limited thereto but is intended to encompass all modifications falling within the scope of the following claims.

I claim:

1. In automatic signal control apparatus, the combination of first capacitor means, input means including a first unilaterally conductive device forming a conductive path for charging said first capacitor means, voltage divider means connected to said first capacitor means, second capacitor means, means connected to said voltage divider means and including a second unilaterally conductive device for charging said second capacitor means in response to the voltage across said first capacitor means, and means connected to said voltage divider means and including a third unilaterally conductive device for discharging said second capacitor means.

2. In sound recording-reproducing apparatus, the combination of amplifier means having signal responsive gain control means, first capacitor means, input means connected to receive the output of said amplifier means and including a first unilaterally conductive device for charging said first capacitor means, voltage divider means connected to said first capacitor means, second capacitor means, means connected to a lower voltage tap on said voltage divider means and including a second unilaterally conductive device for charging said second capacitor means in response to a portion of the voltage across said first capacitor means, means connected to a higher voltage tap on said voltage divider means and including a third unilaterally conductive device for discharging said second capacitor means, and means responsive to the voltage across said second capacitor means for supplying a control signal to said amplifier gain control means.

3. Sound recording-reproducing apparatus as defined in claim 2 in which said first, second and third unilaterally conductive devices are poled so as to cause said amplifier gain control means to reduce the gain of said amplifier means with increasing amplifier means output signal level.

4. Sound recording-reproducing apparatus as defined in claim 2 in which said first, second and third unilaterally conductive devices are poled so as to cause said amplifier gain control means to increase the gain of said amplifier means with increasing amplifier means output signal level.

5. In automatic signal control apparatus, the combination of amplifier means having signal responsive gain control means, and signal generating means responsive to increasing signal level in said amplifier means for supplying a control signal to said gain control means to modify the gain of said amplifier means in a given mode, and responsive to decreasing signal level in said amplifier means and rendered operative after a predetermined drop in signal level for supplying a control signal to said gain control means to modify the gain of said amplifier in a manner complementary to said given mode, said control signal generating means comprising first capacitor means, means including a first unilaterally conductive device for coupling the signal in said amplifier means to charge said first capacitor means, voltage divider means coupled to said first capacitor means, second capacitor means, means coupled to said voltage divider means and including a second unilaterally conductive device for charging said second capacitor means in response to the voltage across said first capacitor means, means connected to said voltage divider means and including a third unilaterally conductive device for discharging said second capacitor means, and means coupling said second capacitor means to said gain control means.

6. In automatic signal control apparatus, the combination of signal attenuator means having movable means for varying the attenuation thereof, motive means for driving said movable means, means coupling said motive means to said movable means to actuate said movable means only after a preselected amount of motion of said motive means, means responsive to increasing attenuator means signal level for controlling said motive means to actuate said movable means to modify the attenuation of said attenuator means according to a given mode, and means responsive to decreasing attenuator means signal level for controlling said motive means to actuate said movable means to modify the attenuation of said attenuator means in a manner complementary to said given mode, said preselected amount of motion of said motive means before actuation of said attenuator means corresponding to a predetermined change in attenuator means signal level, whereby the attenuation of said attenuator means is not varied in response to signal level changes of less than said predetermined change.

References Cited by the Examiner

UNITED STATES PATENTS

| | | | |
|---|---|---|---|
| 1,784,178 | 12/30 | Carpe | 330—132 |
| 2,162,875 | 6/39 | Bartels et al. | 330—132 |
| 2,585,890 | 2/52 | Wolfe | 330—134 |
| 2,750,452 | 6/56 | Goodrich | 330—144 X |
| 2,750,457 | 6/56 | Padgett | 330—138 |
| 2,767,255 | 10/56 | Talamini | 330—138 |
| 2,813,156 | 11/57 | McCoy | 330—144 |
| 2,935,697 | 5/60 | McManis. | |
| 2,958,048 | 10/60 | Woods | 330—144 |

ROY LAKE, *Primary Examiner.*

ARTHUR GAUSS, *Examiner.*